(12) United States Patent
Woolward et al.

(10) Patent No.: US 11,575,563 B2
(45) Date of Patent: Feb. 7, 2023

(54) CLOUD SECURITY MANAGEMENT

(71) Applicant: vArmour Networks, Inc., Mountain View, CA (US)

(72) Inventors: Marc Woolward, Bude (GB); Keith Stewart, San Francisco, CA (US); Timothy Eades, Redwood City, CA (US); Meng Xu, Los Altos, CA (US); Myo Zarny, Bayside Hills, NY (US); Matthew M. Williamson, Marblehead, MA (US); Jason Parry, San Francisco, CA (US); Hong Xiao, San Jose, CA (US); Hsisheng Wang, Fremont, CA (US); Cheng-Lin Hou, San Jose, CA (US)

(73) Assignee: vArmour Networks, Inc., Los Altos, CA (US)

( * ) Notice: Subject to any disclaimer, the term of this patent is extended or adjusted under 35 U.S.C. 154(b) by 0 days.

(21) Appl. No.: 16/428,828

(22) Filed: May 31, 2019

(65) Prior Publication Data

US 2020/0382363 A1 Dec. 3, 2020

(51) Int. Cl.
*H04L 41/08* (2022.01)
*G06F 16/17* (2019.01)
(Continued)

(52) U.S. Cl.
CPC .......... *H04L 41/08* (2013.01); *G06F 16/1734* (2019.01); *G06F 16/906* (2019.01); *G06F 16/9024* (2019.01); *G06F 9/541* (2013.01)

(58) Field of Classification Search
CPC ... H04L 41/08; G06F 16/906; G06F 16/1734; G06F 16/9024; G06F 9/541
See application file for complete search history.

(56) References Cited

U.S. PATENT DOCUMENTS 6,253,321 B1    6/2001   Nikander et al.
6,484,261 B1   11/2002   Wiegel
(Continued)

FOREIGN PATENT DOCUMENTS

TW    201642616 A   12/2016
TW    201642617 A   12/2016
(Continued)

OTHER PUBLICATIONS

"International Search Report" and "Written Opinion of the International Searching Authority," Patent Cooperation Treaty Application No. PCT/US2016/024116, dated May 3, 2016, 12 pages.
(Continued)

*Primary Examiner* — William G Trost, IV
*Assistant Examiner* — Monishwar Mohan
(74) *Attorney, Agent, or Firm* — Carr & Ferrell LLP

(57) ABSTRACT

Methods and systems for managing security in a cloud computing environment are provided. Exemplary methods include: gathering data about workloads and applications in the cloud computing environment; updating a graph database using the data, the graph database representing the workloads of the cloud computing environment as nodes and relationships between the workloads as edges; receiving a security template, the security template logically describing targets in the cloud computing environment to be protected and how to protect the targets; creating a security policy using the security template and information in the graph database; and deploying the security policy in the cloud computing environment.

17 Claims, 7 Drawing Sheets

(51) Int. Cl.
*G06F 16/906* (2019.01)
*G06F 16/901* (2019.01)
*G06F 9/54* (2006.01)

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,627,671 B1 | 12/2009 | Palma |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Mbisu et al. |
| 8,528,091 B2 | 9/2013 | Bowen et al. |
| 8,539,548 B1 * | 9/2013 | Overby, Jr. ......... G06F 21/6218 726/21 |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,798,055 B1 | 8/2014 | An |
| 8,813,169 B2 | 8/2014 | Shieh |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,021,546 B1 * | 4/2015 | Banerjee ............... H04L 63/102 718/1 |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,405,665 B1 | 8/2016 | Shashi et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,794,289 B1 * | 10/2017 | Banerjee ............... H04L 63/20 |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,116,441 B1 | 10/2018 | Rubin et al. |
| 10,191,758 B2 | 1/2019 | Ross et al. |
| 10,193,929 B2 | 1/2019 | Shieh et al. |
| 10,264,025 B2 | 4/2019 | Woolward |
| 10,333,827 B2 | 6/2019 | Xu et al. |
| 10,333,986 B2 | 6/2019 | Lian et al. |
| 10,382,467 B2 | 8/2019 | Wager et al. |
| 10,528,897 B2 * | 1/2020 | Labat ..................... G06Q 10/06 |
| 10,630,703 B1 | 4/2020 | Ghosh et al. |
| 10,755,334 B2 | 8/2020 | Eades et al. |
| 10,862,748 B1 | 12/2020 | Deruijter |
| 11,290,494 B2 | 3/2022 | Li et al. |
| 11,310,284 B2 | 4/2022 | Woolward et al. |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2004/0172557 A1 | 9/2004 | Nakae et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0154576 A1 | 7/2005 | Tarui |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | Van Rietschote |
| 2007/0157286 A1 * | 7/2007 | Singh ..................... H04L 41/28 726/1 |
| 2007/0162400 A1 | 7/2007 | Brew et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0195670 A1 | 8/2008 | Boydstun |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0077666 A1 | 3/2009 | Chen et al. |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |

(56) References Cited

U.S. PATENT DOCUMENTS

| | | |
|---|---|---|
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Bimbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1* | 7/2012 | Martinez .............. H04L 12/6418 726/1 |
| 2012/0207174 A1 | 8/2012 | Shieh |
| 2012/0216273 A1 | 8/2012 | Rolette et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0054536 A1 | 2/2013 | Sengupta |
| 2013/0081142 A1 | 3/2013 | McDougal et al. |
| 2013/0086399 A1 | 4/2013 | Tychon et al. |
| 2013/0097138 A1 | 4/2013 | Barkol et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0198799 A1 | 8/2013 | Staggs et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0033267 A1 | 1/2014 | Aciicmez |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0337743 A1 | 11/2014 | Branton |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0180949 A1 | 6/2015 | Maes |
| 2015/0229641 A1 | 8/2015 | Sun et al. |
| 2015/0235229 A1 | 8/2015 | Pryor |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0162179 A1 | 6/2016 | Annett et al. |
| 2016/0173521 A1* | 6/2016 | Yampolskiy ........ H04L 61/4511 726/25 |
| 2016/0191466 A1 | 6/2016 | Pemicha |
| 2016/0191545 A1 | 6/2016 | Nanda et al. |
| 2016/0203331 A1 | 7/2016 | Khan et al. |
| 2016/0234250 A1* | 8/2016 | Ashley .................... H04L 63/20 |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2016/0357424 A1 | 12/2016 | Pang et al. |
| 2016/0357774 A1 | 12/2016 | Gauci et al. |
| 2017/0005986 A1 | 1/2017 | Bansal et al. |
| 2017/0063795 A1 | 3/2017 | Lian et al. |
| 2017/0085654 A1 | 3/2017 | Mikhailov et al. |
| 2017/0118218 A1 | 4/2017 | Koottayi |
| 2017/0134422 A1* | 5/2017 | Shieh .................... H04L 63/20 |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0251013 A1 | 8/2017 | Kirti |
| 2017/0279770 A1 | 9/2017 | Woolward |
| 2017/0302685 A1 | 10/2017 | Ladnai et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0083977 A1 | 3/2018 | Murugesan et al. |
| 2018/0095976 A1 | 4/2018 | Shelksohn |
| 2018/0191779 A1 | 7/2018 | Shieh et al. |
| 2018/0232262 A1 | 8/2018 | Chowdhury et al. |
| 2019/0043534 A1 | 2/2019 | Sievert |
| 2019/0052549 A1 | 2/2019 | Duggal et al. |
| 2019/0081963 A1 | 3/2019 | Waghorn |
| 2019/0141075 A1 | 5/2019 | Gay |
| 2019/0273746 A1 | 9/2019 | Coffing |
| 2019/0278760 A1 | 9/2019 | Smart |
| 2019/0317728 A1* | 10/2019 | Chen ...................... G06N 20/00 |
| 2019/0342307 A1* | 11/2019 | Gamble .............. G06F 16/9024 |
| 2019/0394225 A1* | 12/2019 | Vajipayajula ....... G06F 16/9024 |
| 2020/0043008 A1 | 2/2020 | Hrabik |
| 2020/0065343 A1 | 2/2020 | Morkovine |
| 2020/0074078 A1 | 3/2020 | Saxe et al. |
| 2020/0076826 A1 | 3/2020 | Ford |
| 2020/0145441 A1 | 5/2020 | Patterson et al. |
| 2020/0169565 A1 | 5/2020 | Badawy et al. |
| 2020/0259852 A1 | 8/2020 | Wolff |
| 2020/0382556 A1 | 12/2020 | Woolward et al. |
| 2020/0382557 A1 | 12/2020 | Woolward et al. |
| 2020/0382560 A1 | 12/2020 | Woolward et al. |
| 2020/0382586 A1 | 12/2020 | Badawy et al. |

(56) References Cited

U.S. PATENT DOCUMENTS

2021/0120029 A1 4/2021 Ross et al.
2021/0168150 A1 6/2021 Ross et al.

FOREIGN PATENT DOCUMENTS

| TW | 201642618 A | 12/2016 |
| --- | --- | --- |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

"International Search Report" and "Written Opinion of the International Searching Authority," Patent Cooperation Treaty Application No. PCT/US2016/024300, dated May 3, 2016, 9 pages.

"International Search Report" and "Written Opinion of the International Searching Authority," Patent Cooperation Treaty Application No. PCT/US2016/024053, dated May 3, 2016, 12 pages.

"International Search Report" and "Written Opinion of the International Searching Authority," Patent Cooperation Treaty Application No. PCT/US2016/019643, dated May 6, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, dated Jun. 20, 2016, 9 pages.

"Feature Handbook: NetBrain® Enterprise Edition 6.1" NetBrain Technologies, Inc., Feb. 25, 2016, 48 pages.

Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.

"International Search Report" and "Written Opinion of the International Searching Authority," Patent Cooperation Treaty Application No. PCT/US2016/065451, dated Jan. 12, 2017, 20 pages.

Maniar, Neeta, "Centralized Tracking and Risk Analysis of 3rd Party Firewall Connections," SANS Institute InfoSec Reading Room, Mar. 11, 2005, 20 pages.

Hu, Hongxin et al., "Detecting and Resolving Firewall Policy Anomalies," IEEE Transactions on Dependable and Secure Computing, vol. 9, No. 3, May/Jun. 2012, pp. 318-331.

Woolward et al., "Template-Driven Intent-Based Security," U.S. Appl. No. 16/428,838, filed May 31, 2019, Specification, Claims, Abstract, and Drawings, 60pages.

Woolward et al., "Validation of Cloud Security Policies," U.S. Appl. No. 16/428,849, filed May 31, 2019, Specification, Claims, Abstract, and Drawings, 54 pages.

Woolward et al., "Reliability Prediction for Cloud Security Policies," U.S. Appl. No. 16/428,858, filed May 31, 2019, Specification, Claims, Abstract, and Drawings, 59 pages.

Bates, Adam Macneil, "Designing and Leveraging Trustworthy Provenance-Aware Architectures", ProQuest Dissertations and Theses ProQuest Dissertations Publishing, 2017, 147 pages.

Wang et al., "System and Method for Attributing User Behavior from Multiple Technical Telemetry Sources," U.S. Appl. No. 17/162,761, filed Jan. 29, 2021; Specification, Claims, Abstract, and Drawings, 31 pages.

\* cited by examiner

CLOUD SECURITY MANAGEMENT

FIELD OF THE INVENTION

The present technology pertains to communications networks, and more specifically to security in cloud computing environments.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Due to the extensive use of computer networks by enterprises, there has been a dramatic rise in network attacks, a proliferation of computer viruses, and a constant distribution of other types of malicious content that attempts to attack, infect, or otherwise infiltrate the computer networks. Attackers breach internal networks and public clouds to steal critical data. For example, attackers target low-profile assets to enter the internal network. Inside the internal network and public clouds, and behind the hardware firewall, attackers move laterally across the internal network, exploiting East-West traffic flows, to critical enterprise assets. Once there, attackers siphon off valuable company and customer data.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various methods and systems for cloud security management. Specifically, a method for cloud security management may comprise: gathering data about workloads and applications in the cloud computing environment; updating a database using the data, the database representing the workloads of the cloud computing environment as nodes and relationships between the workloads as edges; receiving a security template, the security template logically describing targets in the cloud computing environment to be protected and how to protect the targets; creating a security policy using the security template and information in the graph database; and deploying the security policy in the cloud computing environment.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
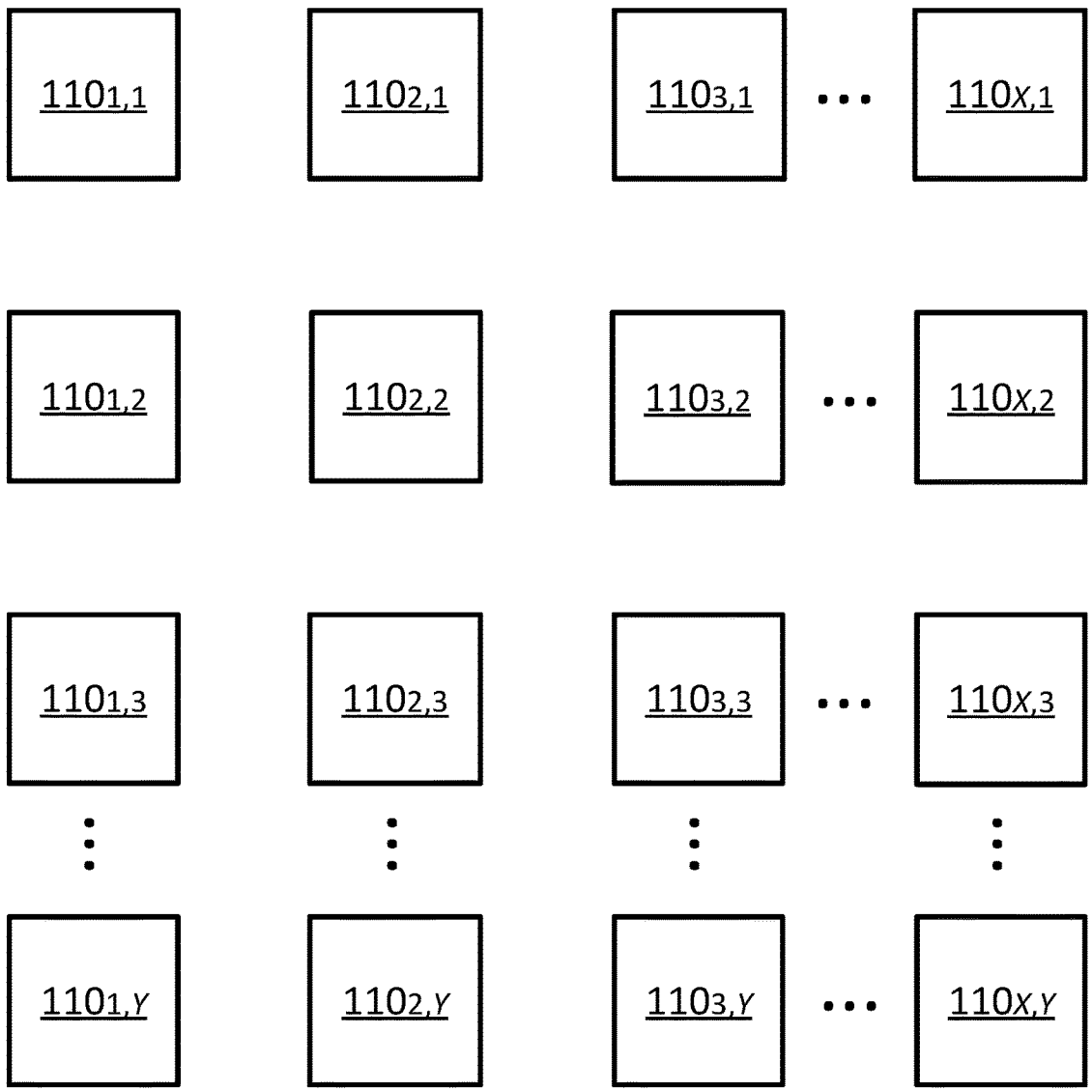
FIG. 1 is a simplified block diagram of a cloud computing environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows cloud computing environment 100 including workloads $110_{1,1}$-$110_{X,Y}$, according to some embodiments. Cloud computing environment 100 provides on-demand availability of computer system resources, such as data storage and computing power. Cloud computing environment 100 can physically reside in one or more data centers and/or be physically distributed over multiple locations. Cloud computing environment 100 can be hosted by more than one cloud service, such as those provided by Amazon, Microsoft, and Google. Cloud computing environment 100 can be limited to a single organization (referred to as an enterprise cloud), available to many organizations (referred to as a public cloud,) or a combination of both (referred to as a hybrid cloud). Examples of public clouds include Amazon Web Services (AWS), Microsoft Azure, and Google Cloud Platform (GCP).

Each of workloads $110_{1,1}$-$110_{X,Y}$ can be a unit of computing resource, such as a physical computing system (also referred to as a bare metal server), virtual machine, container, pod, and combinations thereof. A physical computing system is computer hardware and not a virtual computing system, such as a virtual machine and container. In addition to running operating systems and applications, physical computing systems can be the hardware that virtual computing systems run on.

A virtual machine provides a substitute for a physical computing system, including functionality to execute entire operating systems. Virtual machines are created and run by a hypervisor or virtual machine monitor (VMM). A hypervisor is computer software or firmware which can run on workloads $110_{1,1}$-$110_{X,Y}$. A hypervisor uses native execution to share and manage hardware, allowing for multiple environments which are isolated from one another, yet exist on the same physical computing system.

Containers are an operating system-level virtualization method for deploying and running distributed applications without launching an entire virtual machine for each application. Containers can look like physical computing systems from the point of view of programs running in them. Generally, a computer program running on an operating system can see all resources (e.g., connected devices, files and folders, network shares, CPU power, etc.) of that physical computing system. However, programs running inside a container can only see the container's contents and devices assigned to the container. A pod is a group of containers with shared storage and/or network resources, and a shared specification for how to run the containers.

A container is an instance of an image. An image can be a file, comprised of multiple layers, with information to create a complete and executable version of an application. Containers can be arranged, coordinated, and managed—including means of discovery and communications between containers—by container orchestration (e.g., Docker Swarm®, Kubernetes®, Amazon EC2 Container Service (ECS), Diego, Red Hat OpenShift, and Apache® Mesos™). In contrast to hypervisor-based virtualization, containers may be an abstraction performed at the operating system (OS) level, whereas virtual machines are an abstraction of physical hardware.

Typically, workloads $110_{1,1}$-$110_{X,Y}$ of cloud computing environment 100 individually and/or collectively run applications and/or services. Applications and/or services are programs designed to carry out operations for a specific purpose. By way of non-limiting example, applications can be a database (e.g., Microsoft® SQL Server®, MongoDB, Hadoop Distributed File System (HDFS), etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera®, Scality® RING®, etc.), directory service (e.g., Microsoft® Active Directory®, Domain Name System (DNS) hosting service, etc.), and the like.

Figure 6:
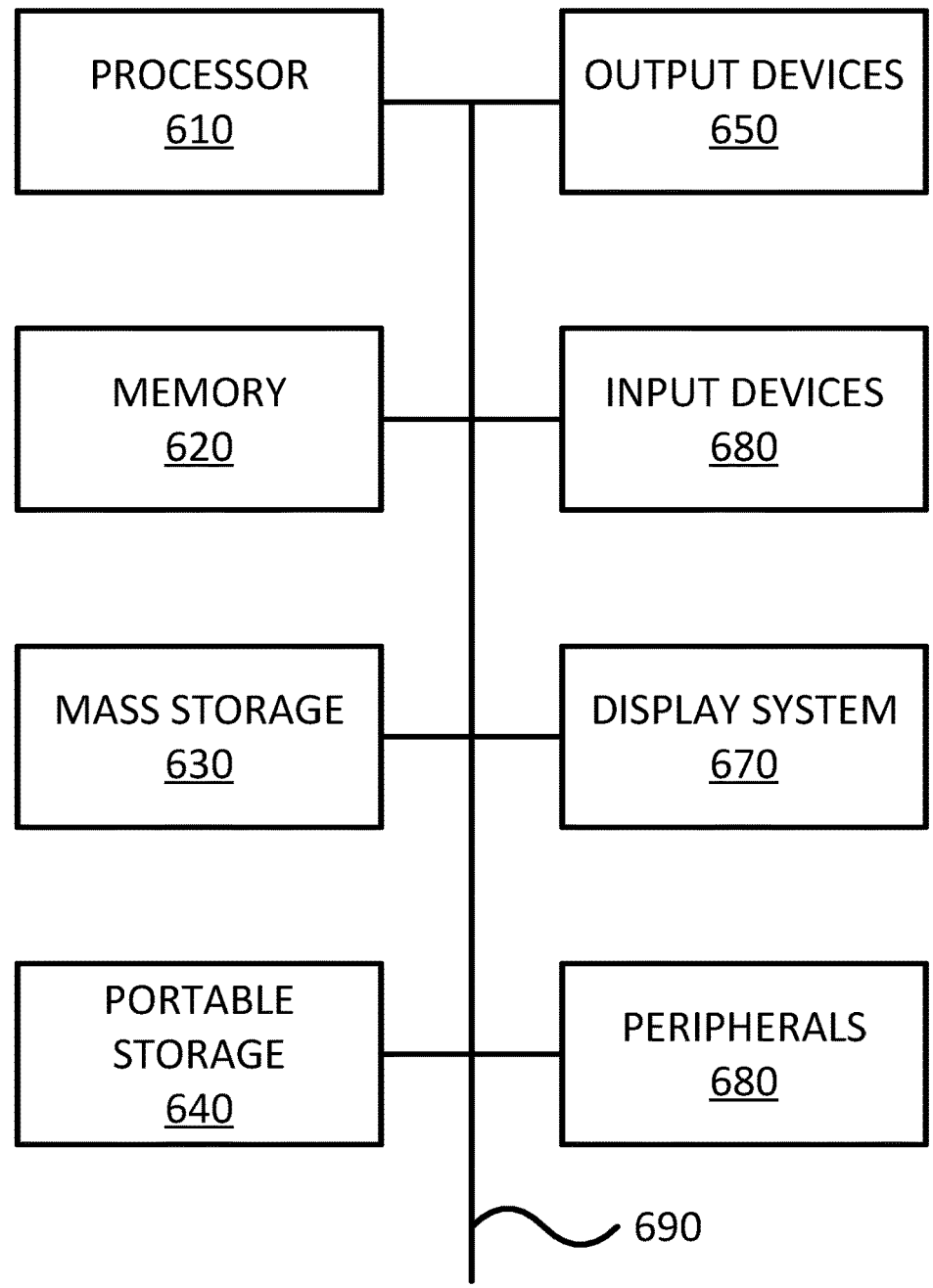
FIG. 6 is a simplified block diagram of a computing system, according to various embodiments.

Physical computing systems and cloud computing environments are described further in relation to FIG. 6.

Figure 2:
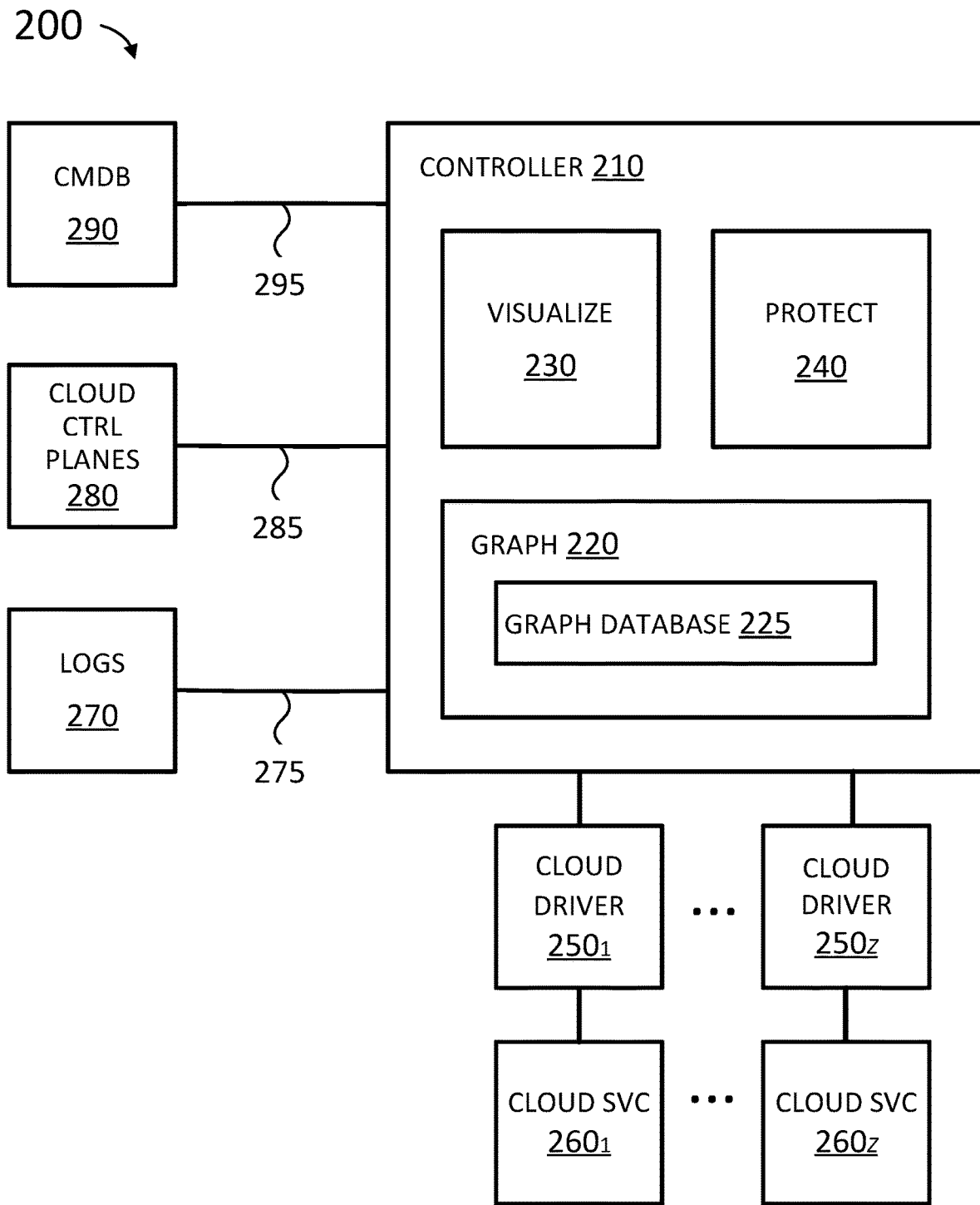
FIG. 2 is a simplified block diagram of a system for cloud security management, according to various embodiments.

FIG. 2 shows system 200 for cloud security management, according to some embodiments. System 200 includes controller 210. Controller 210 can receive streaming telemetry 275 from network logs 270, events 285 from cloud control plane 280, and inventory 295 from configuration management database (CMDB) 290.

Network logs 270 can be data sources such as flow logs from cloud services $260_1$-$260_Z$ (e.g., Amazon Web Services (AWS), Microsoft Azure, and Google Cloud Platform (GCP)), vArmour DSS Distributed Security System, Software Defined Networking (SDN) (e.g., VMware NSX and Cisco Application Centric Infrastructure (ACI)), monitoring agents (e.g., Tanium Asset and Falco), and the like. Generally, streaming telemetry 275 can be low-level data about relationships between applications. Streaming telemetry 275 can include 5-tuple, layer 7 (application layer) process information, management plane logs, and the like. 5-tuple refers to a set of five different values that comprise a Transmission Control Protocol/Internet Protocol (TCP/IP) connection: a source IP address/port number, destination IP address/port number and the protocol in use. Streaming telemetry can alternatively or additionally include a volume of data (i.e., how much data is or how many data packets are) exchanged between workloads (e.g., workloads $110_{1,1}$-$110_{X,Y}$ in FIG. 1) in a network, (dates and) times at which communications (e.g., data packets) are exchanged between workloads, and the like.

Cloud control plane 280 establishes and controls the network and computing resources within a cloud computing environment (e.g., cloud computing environment 100 in FIG. 1). Cloud control plane 280 can include interfaces for managing assets (e.g., launching virtual machines and/or containers, configuring the network, etc.) in a cloud computing environment. For example, cloud control plane 280 can include one or more instances of container orchestration, such as Docker Swarm®, Kubernetes®, Amazon EC2 Container Service (ECS), Diego, and Apache® Mesos™. By way of further non-limiting example, cloud control plane 280 can include VMware vSphere, application programming interfaces (APIs) provided by cloud services $260_1$-$260_Z$, and the like.

Events 285 can include information about a container (and/or a pod) being created, having a state change, having an error, and the like. For example, when a container is created, information about the workload such as a service name, image deployed, and the like can be received in events 285. By way of further example, additional information from an image registry corresponding to the deployed image can be gathered by controller 210.

Configuration management database (CMDB) 290 can be a database of information about the hardware and software components (also known as assets) used in a cloud computing environment (e.g., cloud computing environment 100 in FIG. 1) and relationships between those components and business functions. CMDB 290 can include information about upstream sources or dependencies of components, and the downstream targets of components. For example, inventory 295 can be used to associate an application name and other information (e.g., regulatory requirements, business unit ownership, business criticality, and the like) with the workload (e.g., workloads $110_{1,1}$-$110_{X,Y}$ in FIG. 1) it is running on.

Streaming telemetry 275, events 285, and inventory 295 can be ingested by graph 220. Graph 220 normalizes information received in streaming telemetry 275, events 285, and inventory 295 into a standard data format and/or model, graph database 225. Graph database 225 uses a graph data model comprised of nodes (also referred to as vertices), which is an entity such as a workload (e.g., of workloads $110_{1,1}$-$110_{X,Y}$ in FIG. 1), and edges, which represent the relationship between two nodes. Edges can be referred to as relationships. An edge can have a start node, end node, type, and direction, and an edge can describe parent-child relationships, actions, ownership, and the like. In contrast to relational databases, relationships are (most) important in graph database 225. In other words, connected data is equally (or more) important than individual data points.

Conventionally, security management systems stored raw logs of each and every individual communication between workloads. The amount of data scaled linearly and consumed massive amounts of storage. In contrast, streaming telemetry 275, events 285, and inventory 295, graph 220 (FIG. 2) can be used by graph 220 to create and update graph database 225. The individual communications are not stored. In this way, graph database 225 is advantageously scalable. For example, graph database 225 for a large cloud computing environments of 30,000-50,000 workloads can be stored in memory of a workload (e.g., of workloads $110_{1,1}$-$110_{X,Y}$ in FIG. 1).

Figure 3:
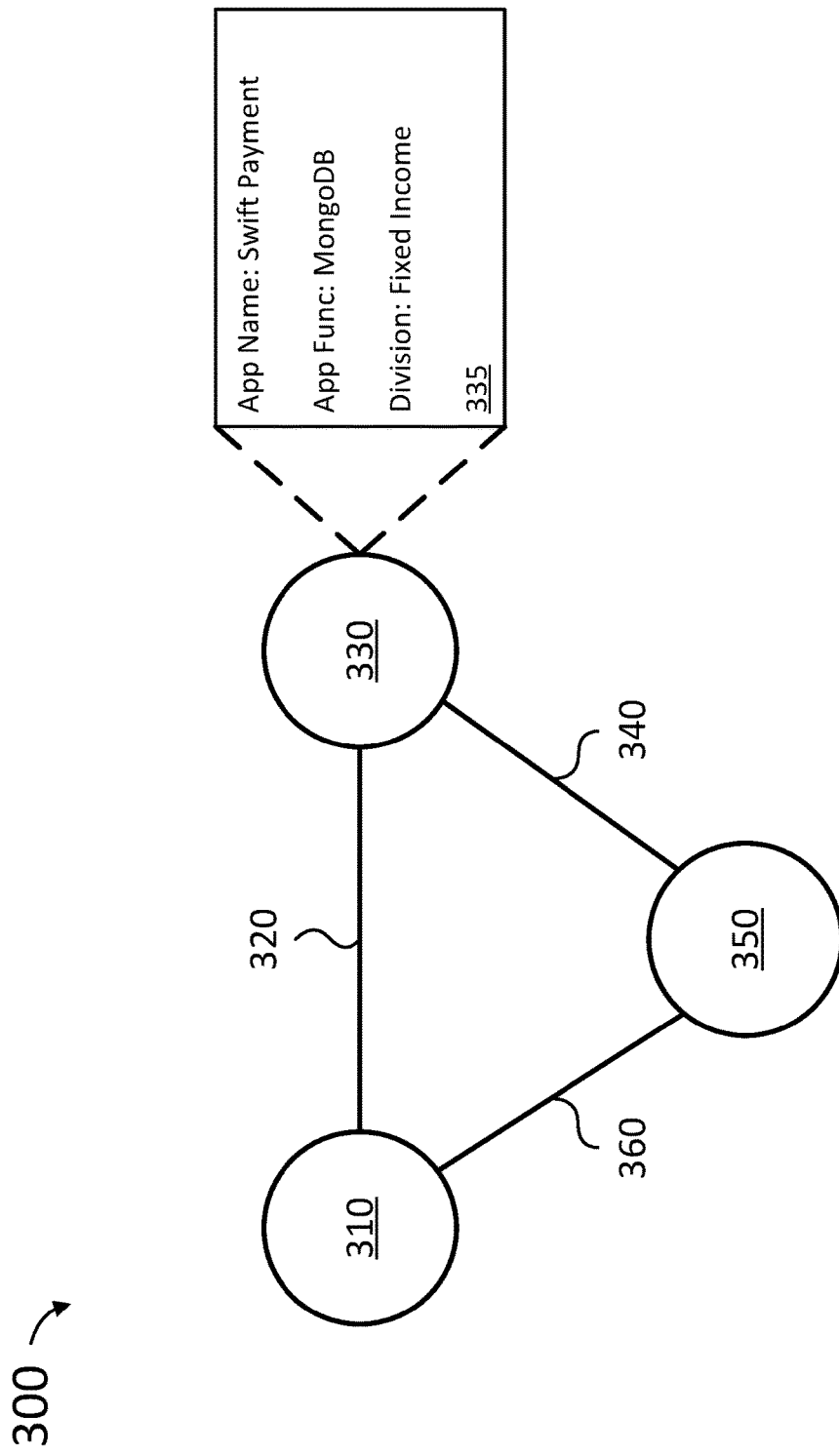
FIG. 3 depicts simplified graph of a cloud computing environment, in accordance with some embodiments.

FIG. 3 depicts (simplified) graph (database) 300 of a cloud computing environment, according to various embodiments. Graph 300 is a simplified example, purely for illustrative purposes, of a graph in graph database 225 (FIG. 2). Graph 300 can include three workloads (e.g., of workloads $110_{1,1}$-$110_{X,Y}$ in FIG. 1): node 310, node 330, and node 350. As shown in FIG. 3, edge (relationship) 320 is between nodes 310 and 330; edge (relationship) 340 is between nodes 330 and 350; edge (relationship) 360 is between nodes 350 and 310.

Using streaming telemetry 275, events 285, and inventory 295, graph 220 (FIG. 2) can determine information 335 about node 330. By way of non-limiting example, information 335 can include an application name, application function, business organization (e.g., division within a company), realm (e.g., production system, development system, and the like), (geographic) location/zone, and other metadata. Moreover, using layer 7 information (when available), the name of the database can be determined.

Referring back to FIG. 2, graph 220 can employ various techniques to manage entropy. In a cloud computing environment (e.g., cloud computing environment 100 in FIG. 1), entropy is change to the workloads (e.g., created and removed), communications among workloads (e.g., which workloads communicate with other workloads), applications and services provided in the network, and the like. Typically in a (closed) enterprise cloud, entropy is low. For example, after monitoring an enterprise cloud for one month, another month of monitoring will reveal little that is new.

On the other hand, a web server connected to the Internet will have high entropy, because the number of relationships (connections) to clients on the Internet (nodes) is huge and continues to grow. To protect the size of graph database 225, graph 220 can recognize when there is high entropy and summarize the nodes. For example, the vast (and growing) number of clients on the Internet is represented by a single "Internet" object with one edge to the web server node.

According to some embodiments, a new relationship can be created around a particular node in graph database 225, as streaming telemetry 275, events 285, and inventory 295 are processed by graph 220. Graph 220 (FIG. 2) can further re-analyze the edges (relationships) connected to the particular node, to classify what the particular node is. For example, if the node accepts database client connections from systems that are known to be application servers, then graph 220 may classify the node as a database management system (i.e., a certain group). Classification criteria can include heuristic rules. Graph 220 can use machine learning algorithms and measure how close a particular node is to satisfying conditions for membership in a group. Classification is described further in U.S. Pat. No. 10,264,025 issued Apr. 16, 2019, titled "Security Policy Generation for Virtualization, Bare-Metal Server, and Cloud Computing Environments," which is hereby incorporated by reference for disclosure of classification.

Figure 4A:
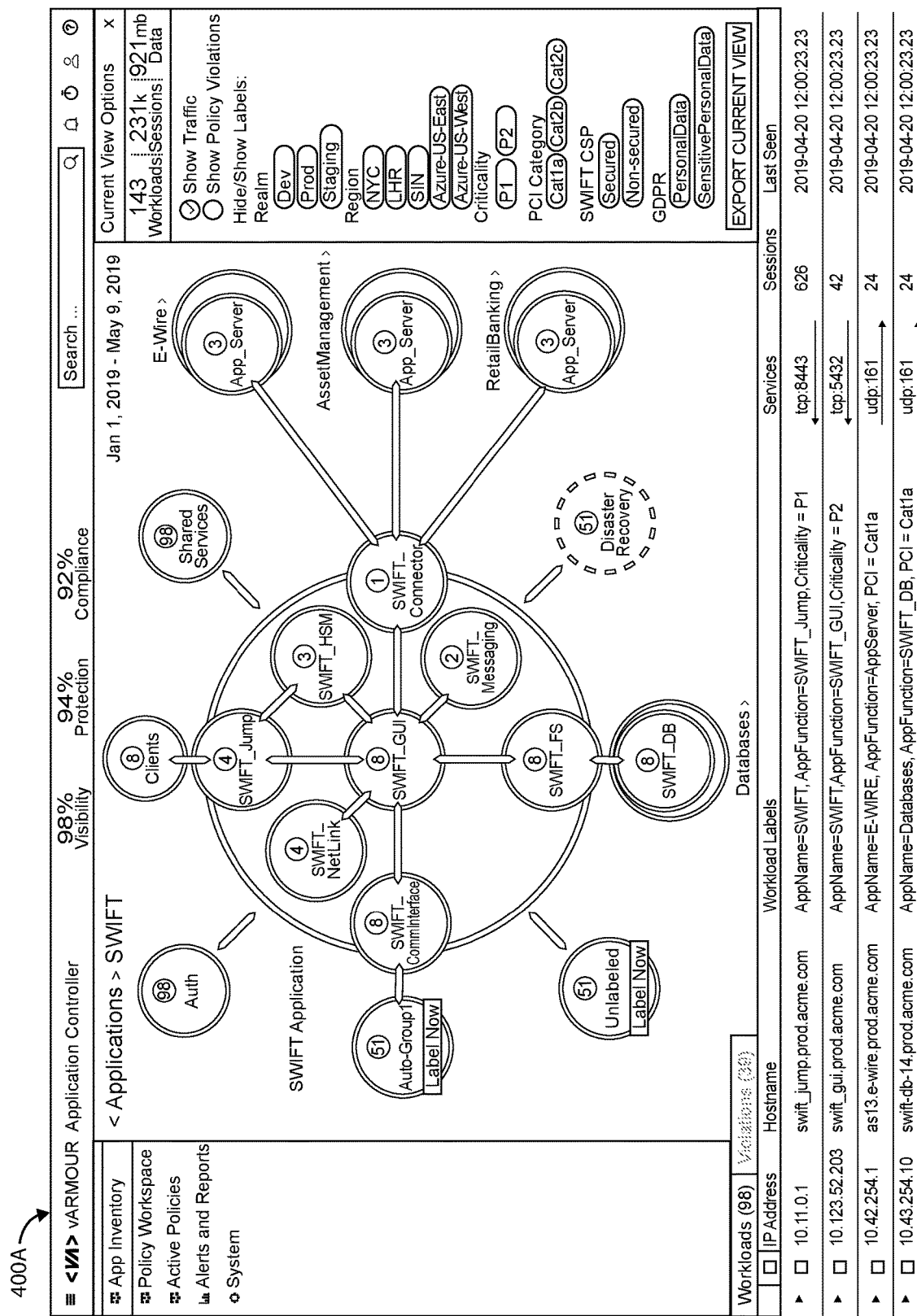
FIG. 4A shows another graph of a cloud computing environment and FIG. 4B depicts a graph of an application, in accordance with various embodiments.
Figure 4B:
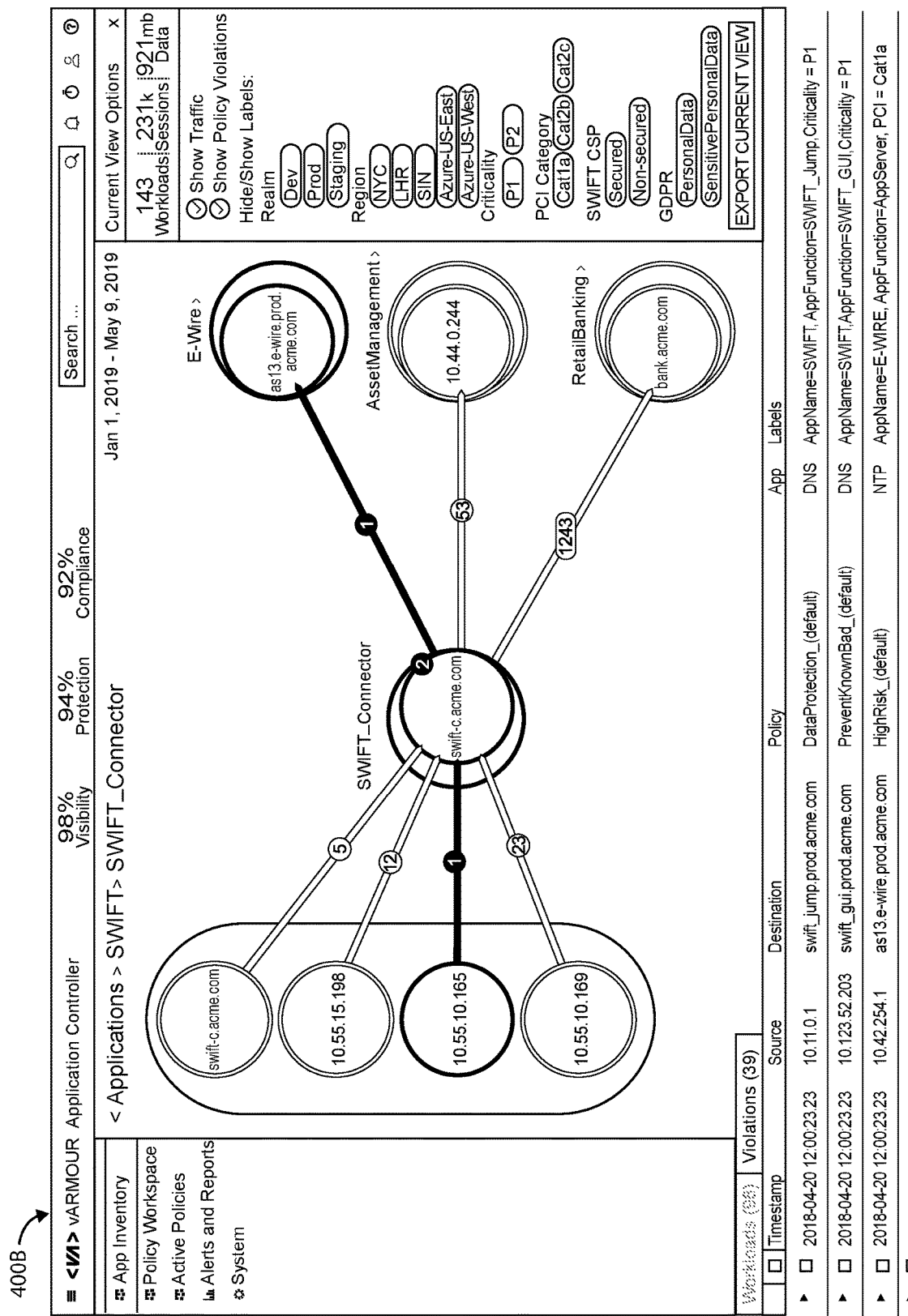

Visualize 230 can visually present information from graph database 225 to users according to various criteria, such as by application, application type, organization, and the like. FIGS. 4A and 4B show example visual presentations 400A and 400B, respectively, in accordance with some embodiments.

Visualize 230 can visually organize information from graph database 225. In some embodiments, nodes that behave similarly can be clustered together (i.e., be put in a cluster). For example, when two nodes have similar edges (relationships) and behave in a similar fashion (e.g., run the same application, are associated with the same organization, and the like), the two nodes can be clustered together. Nodes that are clustered together can be visually presented as a shape (e.g., circle, rectangle, and the like) which denotes that there are a certain number of workloads fulfilling the same function, instead of presenting a shape for each workload in the cluster.

In various embodiments, visualize 230 can detect and present communities. Communities are workloads (e.g., of workloads $110_{1,1}$-$110_{X,Y}$ in FIG. 1) that have a close set of edges (relationships). The constituent workloads of a community do not have to be the same—they can each perform different functions, such as web server, database server, application server, and the like—but the workloads are densely connected. In other words, the nodes communicate with each other often and in high volume. Workloads in a community act collectively to perform an application, service, and/or business function. Instead of displaying a shape (e.g., circle, rectangle, and the like) for each of the hundreds or thousands of workloads in a community, the community can be represented by a single shape denoting the application performed, the number of constituent workloads, and the like.

Protect 240 can use information in the graph database 225 to design security policies. Security policies can implement security controls, for example, to protect an application wherever it is in a cloud computing environment (e.g., cloud computing environment 100 in FIG. 1). A security policy can specify what is to be protected ("nouns"), for example, applications run for a particular organization. A security policy can further specify a security intent ("verbs"), that is, how to protect. For example, a security intent can be to implement Payment Card Industry Data Security Standard (PCI DSS) network segmentation requirements (a regulatory requirement), implement a security best practices for databases, implement a whitelist architecture, and the like. By way of further example, a security intent can be specified in a template by a user (responsible for system administration, security, and the like).

Nouns and verbs can be described in a security template. A security template can include logic about how to process information in graph database 225 relating to workloads having a particular label/selection (nouns). Labels can be provided by network logs 270 (e.g., layer 7 information), cloud control planes 280 (e.g., container orchestration), and CMDB 290. Protect 240 uses a security template to extract workloads to be protected (nouns) from graph database 225. Protect 240 further applies logic in the security template about how to protect the workloads (verbs) to produce a security policy. In various embodiments, security templates are JavaScript Object Notation (JSON) documents, documents in Jinja (or Jinja2), YAML Ain't Markup Language (YAML) documents, Open Policy Agent (OPA) rules, and the like. Jinja and Jinja2 are a web template engine for the Python programming language. YAML is a human-readable data-serialization language. OPA is an open source, general-purpose policy engine that enables unified, context-aware policy enforcement. Security templates are described further in U.S. patent application Ser. No. 16/428,838, filed May 31, 2019, titled "Template-Driven Intent-Based Security," which is hereby incorporated by reference for disclosure of generating a security policy using security templates.

Protect 240 can produce multiple security policies, each reflecting independent pieces of security logic that can be implemented by protect 240. In various embodiments, security policies are JavaScript Object Notation (JSON) documents which are described to a user (responsible for system administration, security, and the like) in natural language. A natural language is any language that has evolved naturally in humans through use and repetition without conscious planning or premeditation. Natural language can broadly be defined in contrast to artificial or constructed languages such as computer programming languages. The multiple security policies can be placed in an order of precedence to resolve potential conflicts. Visualize 230 can be used to visualize the security policy (or security policies), showing the workloads protected, permitted relationships, and prohibited relationships. Protect 240 can then be used to edit the security policy. For example, there can be a primary and backup server (e.g., of workloads $110_{1,1}$-$110_{X,Y}$ in FIG. 1). The backup server may have never been used and may not have the same edges (relationships) as the primary server in graph database 225. The security policy can be edited to give the backup server the same permissions as the primary server.

Protect 240 can validate a security policy. The security policy can be simulated using graph database 225. For example, a simulation can report which applications are broken (e.g., communications among nodes needed by the application to operate are prohibited) by the security policy, are unnecessarily exposed by weak policy, and the like. Security policy validation is described further in U.S. patent application Ser. No. 16/428,849, filed May 31, 2019, titled "Validation of Cloud Security Policies," which is incorporated by reference herein for disclosure of security policy validation.

Protect 240 can test a security policy. Protect can use historical data in graph database 225 to determine entropy in the cloud computing environment (e.g., cloud computing environment 100 in FIG. 1). For example, when a cloud computing environment first starts up, there are initially numerous changes as workloads are brought online and communicate with each other, such that entropy is high. Over time, the cloud computing environment becomes relatively stable with few changes, so entropy becomes low. In general, security policies are less reliable when entropy is high. Protect 240 can determine a level of entropy in the cloud computing environment and produce a reliability score and recommendation for the security policy. Security policy testing is described further in U.S. patent application Ser. No. 16/428,858, filed May 31, 2019, titled "Reliability Prediction for Cloud Security Policies," which is incorporated by reference herein for disclosure of security policy reliability prediction.

Protect 240 can deploy a security policy (or security policies). The security policy is deployed as needed in one or more cloud computing environments of cloud services $260_1$-$260_Z$ (e.g., Amazon Web Services (AWS), Microsoft Azure, and Google Cloud Platform (GCP)), vArmour DSS Distributed Security System, VMware NSX, and the like). Protect 240 can provide the security policy to one or more of cloud drivers $250_1$-$250_Z$. Cloud drivers $250_1$-$250_Z$ maintain an inventory and topology (i.e., current state) of the workloads in the cloud computing environments hosted by cloud services $260_1$-$260_Z$, respectively. Cloud drivers $250_1$-$250_Z$ can use their respective inventory and topology to apply the security policy to the appropriate workloads, and respond immediately to changes in workload topology and workload placement.

Cloud drivers $250_1$-$250_Z$ can serve as an interface between protect 240 (having a centralized security policy) and cloud services $260_1$-$260_Z$. In other words, cloud drivers $250_1$-$250_Z$ implement the security policy using the different facilities (e.g., application programming interfaces (APIs)) and capabilities available from cloud services $260_1$-$260_Z$. For example, each of cloud services $260_1$-$260_Z$ can have different syntax and semantics for implementing security controls. Moreover, each of cloud services $260_1$-$260_Z$ can have different security capabilities (e.g., communications/connections between workloads can only be expressly permitted and not expressly prohibited), rule capacity (limit on the number of rules), optimization methods, and the like.

Cloud drivers $250_1$-$250_Z$ can maintain the integrity of the security policy in the cloud computing environments hosted by cloud services $260_1$-$260_Z$ (referred to as the "cloud"). Cloud drivers $250_1$-$250_Z$ can check that the security policy actually deployed in the cloud is as it should be, using the security policy's JSON source. When the security policy deployed in the cloud does not comport with the centralized security policy—such as when a bad actor logs into one of the cloud services and removes all the security rules—the responsible cloud driver (of cloud drivers $250_1$-$250_Z$) can re-deploy the security policy and/or raise an operational alert. Where supported, cloud services $260_1$-$260_Z$ can notify the respective cloud driver (of cloud drivers $250_1$-$250_Z$) of changes to the topology and/or configuration. Otherwise, the respective cloud driver (of cloud drivers $250_1$-$250_Z$) can poll the cloud service (cloud services $260_1$-$260_Z$) to ensure the security rules are in place.

As described above, a security policy can be pushed down to the cloud computing environments hosted by cloud services $260_1$-$260_Z$ using cloud drivers $250_1$-$250_Z$, respectively. Additionally or alternatively, as new data comes into graph 220 as network logs 270, events 285 from cloud control plane 280, and inventory 295, protect 240 can check the new data against the security policy to detect violations and or drift (e.g., change in the environment and/or configuration).

Protect 240 can dynamically update a security policy as changes occur in the cloud computing environments hosted by cloud services $260_1$-$260_Z$. For example, when a container (or pod) is deployed by container orchestration, it can be given a label, and cloud control plane 280 a container is deployed (as events 285). Labels can be predefined to specify identifying attributes of containers (and pods), such the container's application function. When the label corresponds to an attribute covered by an active (deployed) security policy, protect 240 can dynamically add the new container to the active security policy (as a target). For example, when a pod is deployed for a particular organization and there is an active policy for that organization, the new workload is added to the security policy. Similarly, when a container is killed, the workload is removed from the security policy. Dynamically updating security policy is described further in U.S. Pat. No. 9,521,115 issued Dec. 13, 2016, titled "Security Policy Generation Using Container Metadata," which is hereby incorporated by reference for disclosure of dynamically updating security policy.

Figure 5:
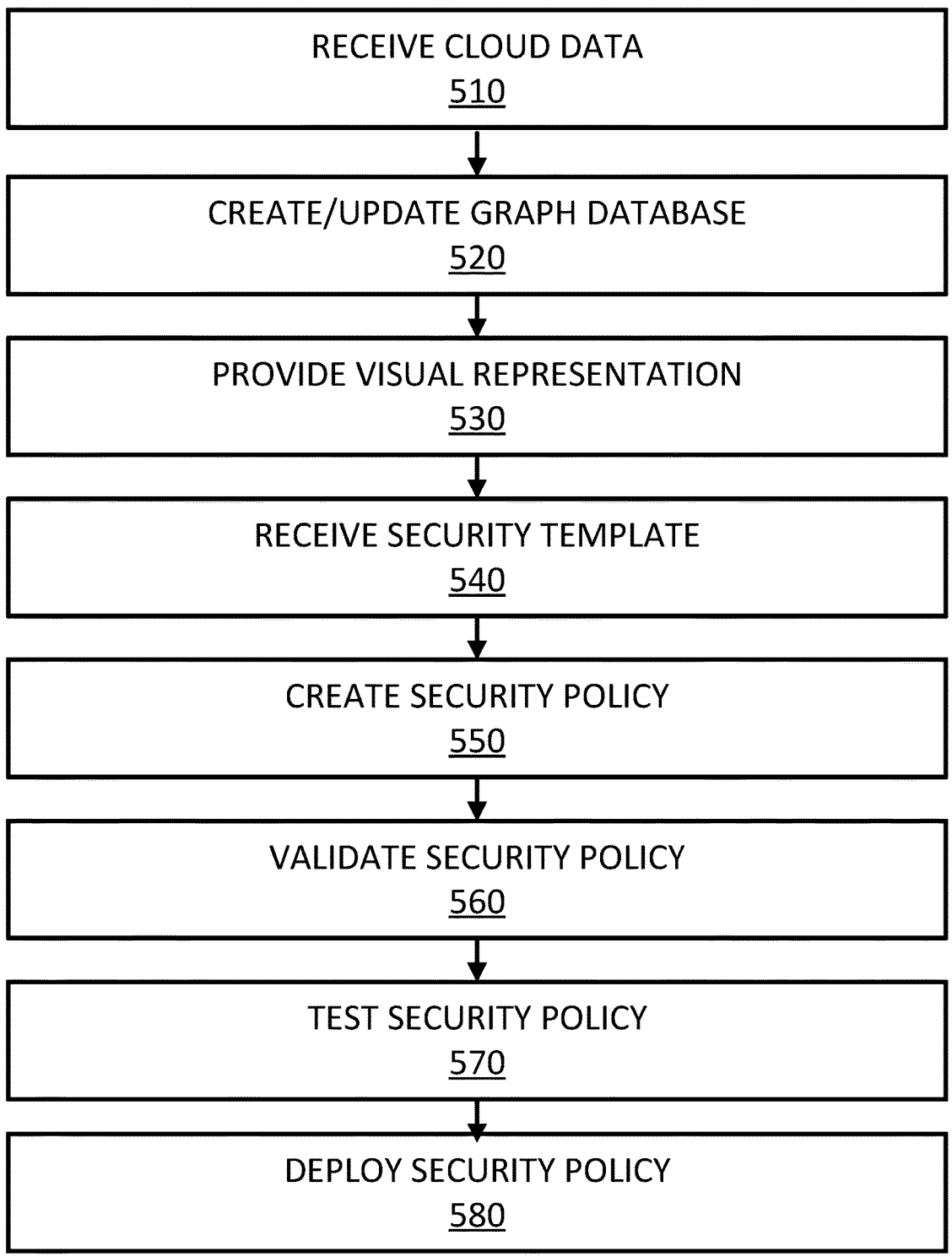
FIG. 5 is a simplified flow diagram of a method for cloud security management, according to some embodiments.

FIG. 5 shows method 500 for managing cloud security, according to some embodiments. Method 500 can be performed by system 200 (FIG. 2), including controller 210. Method 500 can commence at step 510 where data from a cloud computing environment (e.g., cloud computing environment 100 in FIG. 1) can be received. For example, graph 220 (FIG. 2) can receive streaming telemetry 275 from network logs 270, events 285 from cloud control plane 280, and inventory 295 from configuration management database (CMDB) 290.

At step 520, a graph database can be created or updated using the cloud data. For example, streaming telemetry 275, events 285, and inventory 295 (FIG. 2) can be normalized into a standard data format and stored in graph database 225.

At step 530, a visual representation of the cloud computing environment as modeled by the graph database can be provided. For example, visualize 230 (FIG. 2) can present a graph using data in graph database 225. In some embodiments, nodes (representing workloads in the cloud computing environment) can be clustered and/or placed in communities for visual clarity.

At step 540, a security template can be received. A security template can include logic about how to extract information from graph database 225 to identify workloads to be targets of a security policy. In addition, a security template can specify how the workloads are to be protected (e.g., security intent).

At step 550, a security policy can be created. For example, protect 240 can use the security template to extract information from graph database 225 (FIG. 2) to produce a security policy for the security intent of the security template.

At step 560, the security policy can be validated. For example, protect 240 (FIG. 2) tests the security policy against a historical data set stored in graph database 225. Protect 240 can generate a report around the risks and implications of the security policy being implemented.

At step 570, the security policy can be tested. For example, protect 240 (FIG. 2) can measure entropy and a rate of change in the data set stored in graph database 225 to predict—when the security policy is deployed—the cloud computing environment (e.g., cloud computing environment 100 in FIG. 1) will change such that applications and/or services will break (e.g., be prevented from proper operation by the security policy).

At step 580, the security policy can be deployed to the cloud computing environment (e.g., cloud computing environment 100 in FIG. 1). For example, cloud drivers $250_1$-$250_Z$ can produce requests, instructions, commands, and the like which are suitable for and accepted by cloud services $260_1$-$260_Z$ (respectively) to implement the security policy in the cloud computing environments hosted by cloud services $260_1$-$260_Z$ (respectively).

Optionally at step 580, the security policy can be maintained. For example, cloud drivers $250_1$-$250_Z$ can make sure the security policy remains in force at the cloud computing environment hosted by a respective one of cloud services $260_1$-$260_Z$. Optionally at step 580, the security policy can be dynamically updated as workloads subject to the deployed security policy are deployed and/or killed.

Although steps 510-580 are shown in a particular sequential order, various embodiments can perform steps 510-580 in different orders, perform some of steps 510-580 concurrently, and/or omit some of steps 510-580.

FIG. 6 illustrates an exemplary computer system 600 that may be used to implement some embodiments of the present invention. The computer system 600 in FIG. 6 may be implemented in the contexts of the likes of computing systems, networks, servers, or combinations thereof. The computer system 600 in FIG. 6 includes one or more processor unit(s) 610 and main memory 620. Main memory 620 stores, in part, instructions and data for execution by processor unit(s) 610. Main memory 620 stores the executable code when in operation, in this example. The computer system 600 in FIG. 6 further includes a mass data storage 630, portable storage device 640, output devices 650, user input devices 660, a graphics display system 670, and peripheral device(s) 680.

The components shown in FIG. 6 are depicted as being connected via a single bus 690. The components may be connected through one or more data transport means. Processor unit(s) 610 and main memory 620 are connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit(s) 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 in FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral device(s) 680 may include any type of computer support device to add additional functionality to the computer system.

Some of the components provided in the computer system 600 in FIG. 6 can be those typically found in computer systems that may be suitable for use with embodiments of the present disclosure and are intended to represent a broad category of such computer components. Thus, the computer system 600 in FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for managing security in a cloud computing environment, the method comprising:
    gathering data about workloads and applications in the cloud computing environment;
    updating a graph database using the data, the graph database representing the workloads of the cloud computing environment as nodes and relationships between the workloads as edges;
    receiving a security template, the security template having logic to extract information from the graph database for identifying workload targets for a security policy and how to protect the workload targets;
    creating the security policy through a real-time computation using the security template and the information in the graph database;
    deploying the security policy in the cloud computing environment;
    measuring an entropy and a rate of change of information in the graph database;
    calculating a reliability score of the security policy using the entropy and the rate of change of the information in the graph database;
    producing a recommendation for the security policy using the entropy and the rate of change of the information in the graph database; and
    validating the security policy by simulating the security policy using the graph database, the validating the security policy comprising:
        determining a level of the entropy in the cloud computing environment based on the workloads; and
        determining a reliability score and at least one recommendation for the security policy based on the level of the entropy.

2. The computer-implemented method of claim 1, wherein the data includes at least one of streaming telemetry from network logs, events from a cloud control plane, and inventory from a configuration management database.

3. The computer-implemented method of claim 1, wherein at least one of the security template and the security policy is one or more of a JavaScript Object Notation document, Jinja document, Jinja2 document, YAML Ain't Markup Language document, and Open Policy Agent rule.

4. The computer-implemented method of claim 1, wherein the creating the security policy includes:
    identifying the workload targets in the cloud computing environment in the graph database using labels associated with the security template.

5. The computer-implemented method of claim 1, wherein the deploying is performed by a cloud driver using a topology and inventory of the cloud computing environment, the cloud driver communicating with the cloud computing environment using an application programming interface of the cloud computing environment.

6. The computer-implemented method of claim 1, wherein the cloud computing environment is hosted by a plurality of different cloud services, the different cloud services being at least one of a public cloud, private cloud, and on-premise data center.

7. The computer-implemented method of claim 1, further comprising:
    displaying a visual representation of information in the graph database to a user;
    clustering some of the workloads, the some of the workloads having a similar set of relationships; and
    placing others of the workloads into communities, the others of the workloads collectively performing an application.

8. The computer-implemented method of claim 1, further comprising:
    confirming the security policy is deployed in the cloud computing environment.

9. A system for managing security in a cloud computing environment, the system comprising:
    a processor; and
    a memory communicatively coupled to the processor, the memory storing instructions executable by the processor to perform a method comprising:
        gathering data about workloads and applications of the cloud computing environment;
        updating a graph database using the data, the graph database representing the workloads of the cloud computing environment as nodes and relationships between the workloads as edges;
        receiving a security template, the security template having logic to extract information from the graph database for identifying workload targets for a security policy and how to protect the workload targets;
        creating the security policy through a real-time computation using the security template and the information in the graph database;
        deploying the security policy in the cloud computing environment;
        measuring an entropy and a rate of change of information in the graph database;
        calculating a reliability score of the security policy using the entropy and the rate of change of the information in the graph database;
        producing a recommendation for the security policy using the entropy and the rate of change of the information in the graph database; and validating the security policy by simulating the security policy using the graph database, the validating the security policy comprising:
    determining a level of the entropy in the cloud computing environment based on the workloads; and
    determining a reliability score and at least one recommendation for the security policy based on the level of the entropy.

10. The system of claim 9, wherein the data includes at least one of streaming telemetry from network logs, events from a cloud control plane, and inventory from a configuration management database.

11. The system of claim 9, wherein at least one of the security template and the security policy is one or more of a JavaScript Object Notation document, Jinja document, Jinja2 document, YAML Ain't Markup Language document, and Open Policy Agent rule.

12. The system of claim 9, wherein the creating the security policy includes:
    identifying the workload targets in the cloud computing environment in the graph database using labels associated with the security template.

13. The system of claim 9, wherein the deploying is performed by a cloud driver using a topology and inventory of the cloud computing environment, the cloud driver communicating with the cloud computing environment using an application programming interface of the cloud computing environment.

14. The system of claim 9, wherein the cloud computing environment is hosted by a plurality of different cloud services, the different cloud services being at least one of a public cloud, private cloud, and on-premise data center.

15. The system of claim 9, further comprising:
    displaying a visual representation of information in the graph database to a user;
    clustering some of the workloads, the some of the workloads having a similar set of relationships; and
    placing others of the workloads into communities, the others of the workloads collectively performing an application.

16. The computer-implemented method of claim 1, wherein the recommendation for the security policy is: applications and services are prevented from proper operation by the security policy based on the entropy and the rate of change of the information in the graph database.

17. The system of claim 9, wherein the recommendation for the security policy is: applications and services are prevented from proper operation by the security policy based on the entropy and the rate of change of the information in the graph database.

* * * * *